United States Patent
Gibson et al.

(10) Patent No.: US 8,525,369 B2
(45) Date of Patent: Sep. 3, 2013

(54) METHOD AND DEVICE FOR OPTIMIZING THE USE OF SOLAR ELECTRICAL POWER

(75) Inventors: Thomas L. Gibson, Washington Township, MI (US); Nelson A. Kelly, Sterling Heights, MI (US); David B. Ouwerkerk, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 445 days.

(21) Appl. No.: 12/792,499

(22) Filed: Jun. 2, 2010

(65) Prior Publication Data
US 2011/0297204 A1 Dec. 8, 2011

(51) Int. Cl.
H02J 3/14 (2006.01)
(52) U.S. Cl.
USPC .......................................................... 307/31
(58) Field of Classification Search
USPC ............................................ 307/31; 136/244
See application file for complete search history.

(56) References Cited

U.S. PATENT DOCUMENTS

| | | | |
|---|---|---|---|
| 4,175,249 A | 11/1979 | Gruber | |
| 6,350,944 B1 | 2/2002 | Sherif et al. | |
| 6,476,311 B1 | 11/2002 | Lee et al. | |
| 7,510,640 B2 | 3/2009 | Gibson et al. | |
| 7,645,930 B2 | 1/2010 | Kelly et al. | |
| 7,645,931 B2 | 1/2010 | Gibson et al. | |
| 8,344,549 B2 * | 1/2013 | Loh et al. | 307/82 |
| 2003/0047206 A1 | 3/2003 | Kawam | |
| 2005/0166954 A1 | 8/2005 | Koakutsu | |
| 2009/0025782 A1 | 1/2009 | Ojima et al. | |
| 2009/0032082 A1 | 2/2009 | Gilmore et al. | |
| 2009/0167097 A1 | 7/2009 | Seymour et al. | |
| 2009/0273241 A1 | 11/2009 | Gazit et al. | |
| 2009/0283130 A1 | 11/2009 | Gilmore et al. | |
| 2012/0038330 A1 * | 2/2012 | Buiatti et al. | 323/234 |

FOREIGN PATENT DOCUMENTS

| | | |
|---|---|---|
| DE | 19609189 | 9/1997 |
| EP | 1791184 | 5/2007 |
| WO | WO 2009/131923 | 10/2009 |

OTHER PUBLICATIONS

Hansen, A.D., et al., "Models for a Stand-Alone PV System," Risø-R-1219 (EN)/Sec-R-12, Risø National Laboratory, Roskilde, Dec. 2000 (78 pgs).

IEA PVPS, "Impacts of Power Penetration from Photovoltaic Power Systems in Distribution Networks," Task V, Report IEA-PVPS T5-10:2002, Feb. 2002 (24 pgs).

* cited by examiner

*Primary Examiner* — Daniel Cavallari
(74) *Attorney, Agent, or Firm* — Dierker & Associates, P.C.

(57) ABSTRACT

A method for optimizing the use of solar electrical power is disclosed. An operating voltage is determined for a process and at least a second process. The process is selectively connected to a portion of a photovoltaic array having a maximum power point voltage matching the operating voltage of the process. The at least a second process is selectively connected to a respective at least a second portion of the photovoltaic array having a maximum power point voltage matching the operating voltage of the at least a second process. The photovoltaic array has an available amount of electrical power that is distributed to the process and the at least a second process.

10 Claims, 6 Drawing Sheets

METHOD AND DEVICE FOR OPTIMIZING THE USE OF SOLAR ELECTRICAL POWER

TECHNICAL FIELD

The present disclosure relates generally to solar photovoltaic arrays.

BACKGROUND

Industrial processes may be electrically powered. Power for the processes may be delivered from an electric power grid, but may also be locally generated and stored. Photovoltaic cells capture energy from light and convert the energy to electricity. Solar photovoltaic arrays are arrays of photovoltaic cells configured to capture light energy from the sun and convert the energy to electricity. Photovoltaic cells have been manufactured in modules, where a plurality of photovoltaic cells is disposed in an array on a panel.

SUMMARY

A method for optimizing the use of solar electrical power is disclosed. According to the method, an operating voltage is determined for a process and at least a second process. The process is selectively connected to a portion of a photovoltaic array having a maximum power point voltage matching the operating voltage of the process. The at least a second process is selectively connected to a respective at least a second portion of the photovoltaic array having a maximum power point voltage matching the operating voltage of the at least a second process. The photovoltaic array has an available amount of electrical power that is distributed to the process and the at least a second process.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
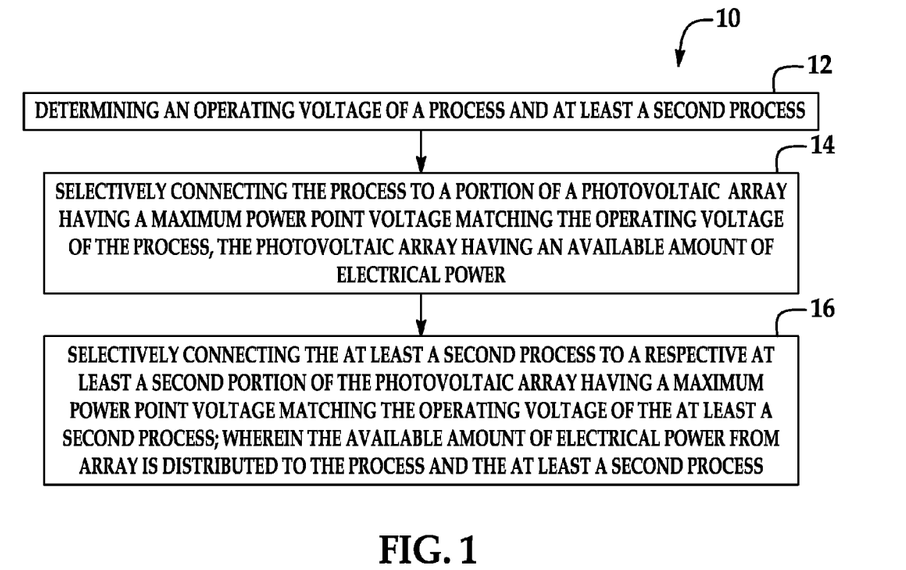
FIG. 1 is a schematic process flow diagram of an example of the method of the present disclosure.
Figure 2:
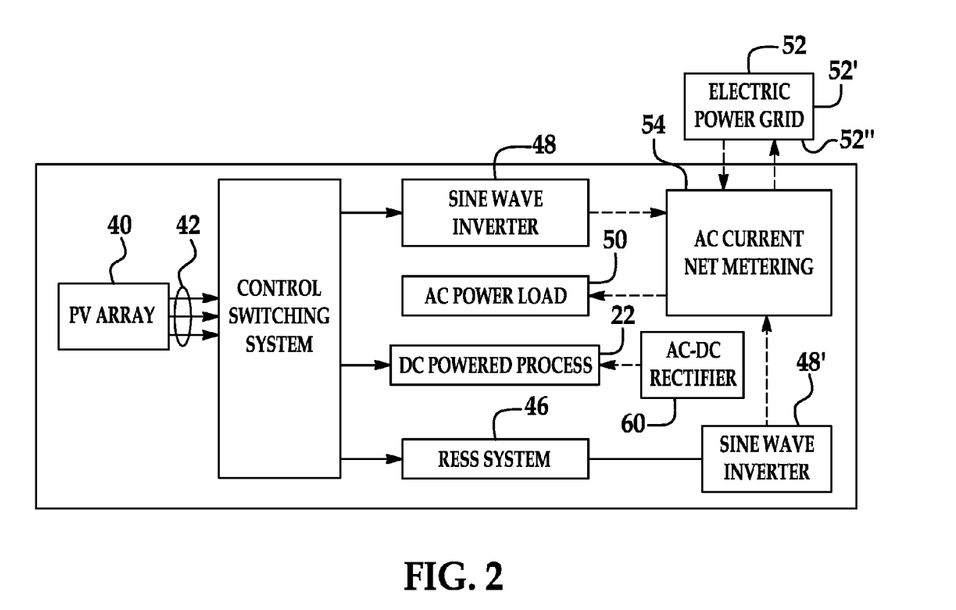
FIG. 2 is a schematic system diagram of an example of the present disclosure.
Figure 2A:
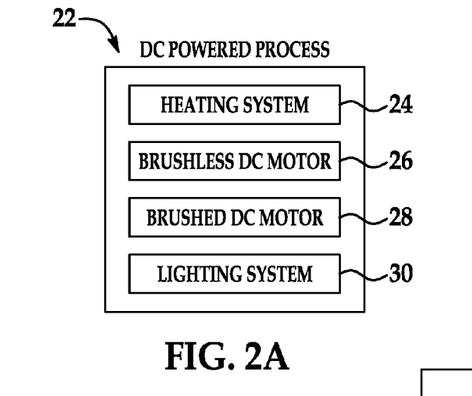
FIG. 2A is a schematic system diagram of an example of a DC Powered Process.

Referring now to FIGS. 1, 2 and 2A, a method 10 for optimizing solar power is disclosed. The method 10 includes determining an operating voltage of a process and at least a second process (as shown at step 12 in FIG. 1). In an example, the process may be a direct current (DC) powered process 22. For example, the process may include a heating system 24, a lighting system 30, or combinations thereof, as seen in FIG. 2A. The process may include a brushed DC motor 28 and/or a brushless DC motor 26. In step 14 as shown in FIG. 1, the process is selectively connected to a portion of a photovoltaic array having a maximum power point voltage matching the operating voltage of the process. Further, the at least a second process is selectively connected to a respective at least a second portion of the photovoltaic array having a maximum power point voltage matching the operating voltage of the at least a second process (as can be seen at step 16 in FIG. 1). The photovoltaic array has an available amount of electrical power, and the available amount of electrical power from the array is distributed to the process and the second process, as well as to subsequent process(es) (if any).

It is to be understood that, as used herein, the smallest electrical power generating component of a photovoltaic (PV) system is a PV cell. Further, a "PV module" as used herein may include a plurality of PV cells. A "PV array" may include one or more PV modules, a plurality of PV cells, or combinations thereof. Thus, a PV module is a PV array, but not every PV array is a PV module.

FIG. 2 is a schematic representation of a PV array in an industrial application according to an example of the disclosed method. FIG. 2 shows three general categories of distribution of the DC power output from the PV array 40. First, a DC powered process 22 may be directly connected to a PV array 40 or (second) to a rechargeable energy storage system (RESS) 44. The DC power required by the DC powered process 22 is matched to the PV array output 42 or RESS output 46. Li-ion batteries are an example of an energy efficient RESS 44 with high energy density per unit mass. Lead-acid batteries are another example of an RESS 44. A third category of distribution shown in FIG. 2 includes DC power from a PV array 40 or RESS that may be passed through a sine-wave inverter 48, 48' and transformed to AC power that can be used to power AC loads 50. The transformed AC power may also be supplied to a power grid 52 through net metering 54.

"Direct connection" is a general category for distribution of the DC power output from the PV array 40. The DC power output from the PV array 40 can be connected directly to a load using an optimized PV array 40 with a maximum power point (MPP) voltage matching the DC powered process 22 without going through power conversion electronics. Some non-limitative examples of DC powered processes 22 are computers, heating elements, lighting, DC motors, and machinery, including pumps, compressors, heating, ventilation, and air conditioning equipment powered by DC electric motors.

Figure 9:
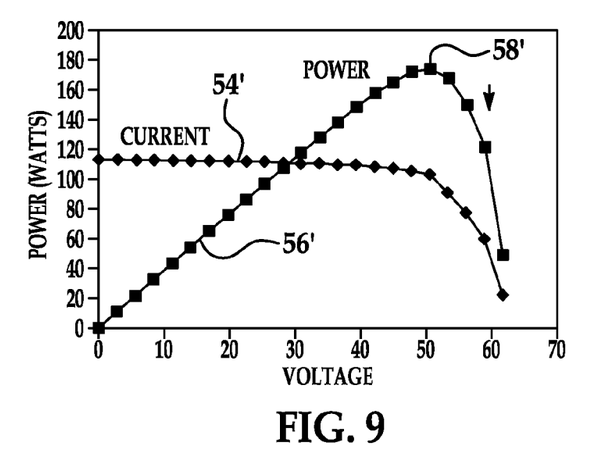
FIG. 9 is a graph depicting current, voltage and power curves of a typical photovoltaic module.

FIG. 9 is a graph depicting current, voltage and power curves of a typical photovoltaic module. The power-voltage curve 56' shows that power increases substantially linearly with voltage until the curve nears a maximum power point (MPP) at the peak 58' of the power-voltage curve 56'. As the PV module voltage increases beyond the MPP, the PV module power drops. Also shown in FIG. 9 is a current-voltage curve 54' corresponding to the same PV module corresponding to power voltage curve 56'. The current descends a small amount, and substantially linearly with voltage until the voltage associated with the MPP 58' is reached. At voltages higher than the voltage corresponding to MPP, the current drops quickly with increasing voltage.

Figure 7:
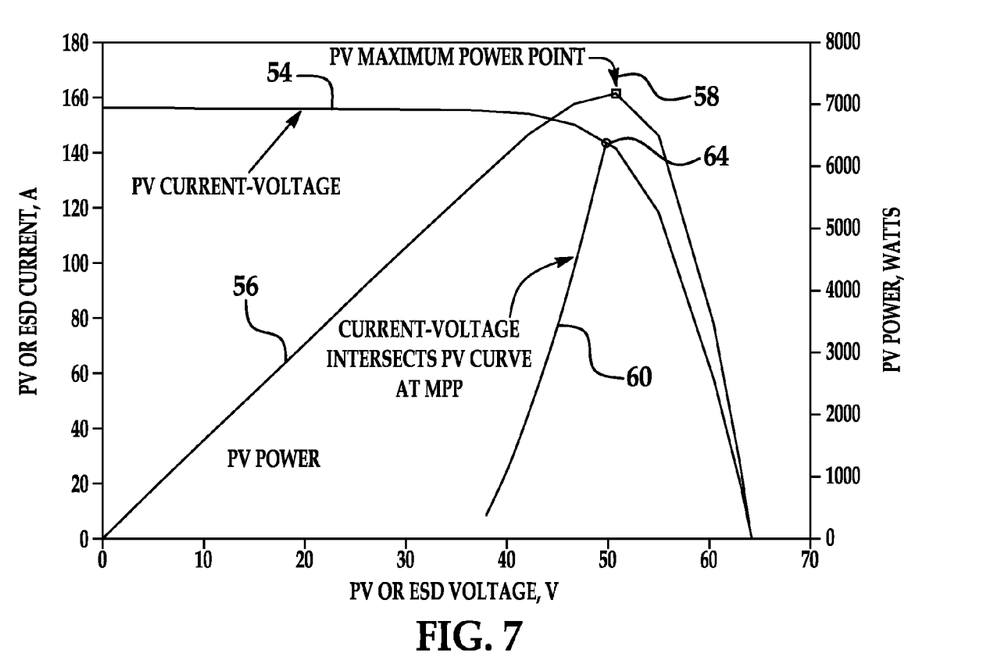
FIG. 7 is a graph representing relationships between a photovoltaic array and load power, current, and voltage according to an example of the present disclosure.
Figure 8:
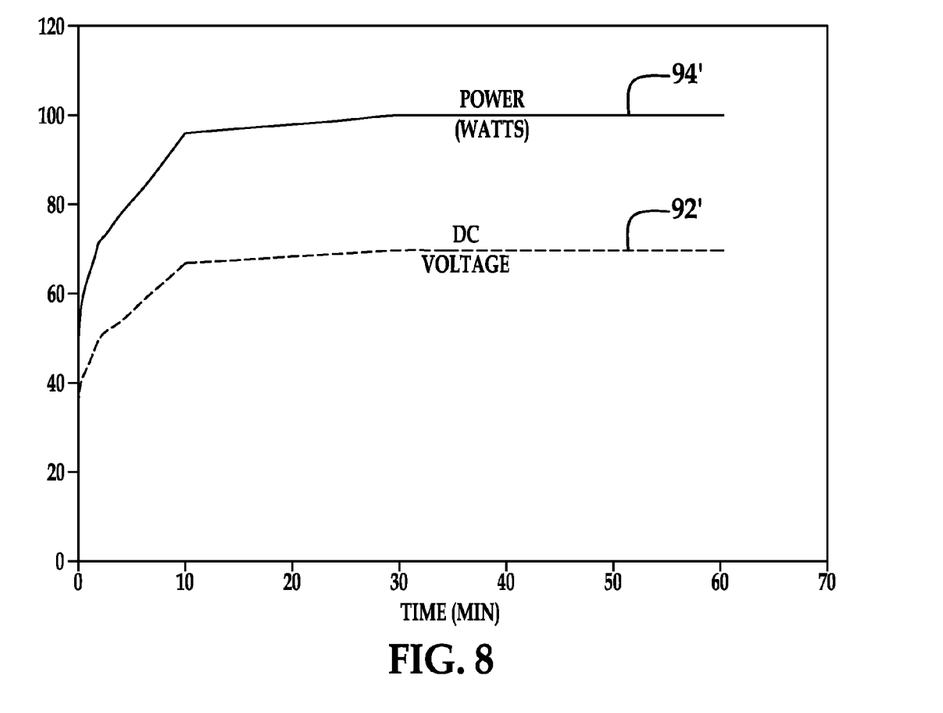
FIG. 8 is a graph depicting a typical heating or lighting load at power-up.
Figure 11:
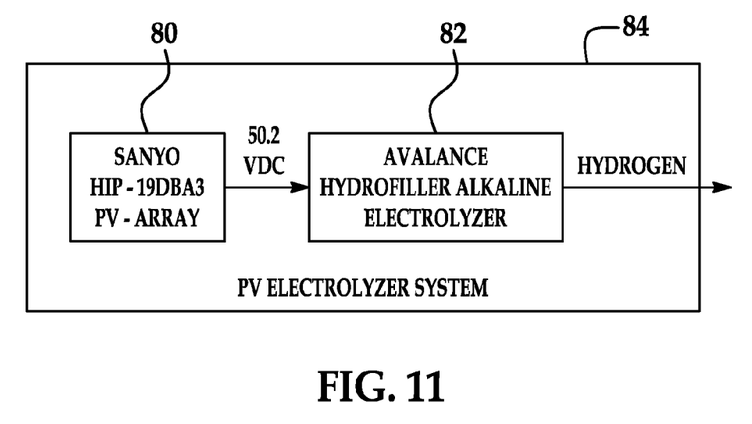
FIG. 11 is a schematic diagram depicting a Sanyo model HIP-190BA3 PV array connected to an Avalence Hydrofiller alkaline electrolyzer.

An example of matching a DC power output 42 from the PV array 40 with a DC process 22 is provided below. Referring to FIG. 7, a PV array 40 has a maximum power point (MPP) at the peak 58 of the PV power curve 56. When considering PV array power with respect to PV array voltage, the PV array power 56 will increase with PV array voltage until the MPP is reached. As PV array voltage increases beyond the MPP, the PV array power drops. Also shown in FIG. 7 are current-voltage curves 54, 60 corresponding to the PV array 40 and the DC powered process 22, respectively. The intersection 64 of the current-voltage curves 54, 60 is substantially at a voltage corresponding to the MPP voltage. In examples depicted in FIGS. 11 and 12, a solar PV array was matched to the power requirements of alkaline and proton exchange membrane (PEM) electrolyzers. In the example depicted in FIG. 11, a Sanyo model HIP-190BA3 PV array 80 exhibited a MPP voltage of 50.2 volts DC at its usual operating temperature (52° C.). (All photovoltaic cells of the Sanyo solar PV array were connected in series.) The Sanyo solar PV array was connected to an Avalence Hydrofiller alkaline electrolyzer 82 that typically operated with a voltage of 49.8 V DC. Since the PV array 80 MPP voltage was matched to the load (electrolyzer 82) operating voltage, the PV electrolyzer system 84 operated at a maximum solar energy to hydrogen fuel energy efficiency of 10%. This system efficiency is calculated by multiplying the solar energy to electric power efficiency (16% for the Sanyo HIP-190BA3 PV array) times the electrolyzer efficiency (60% electric energy to hydrogen lower heating value (LHV)) at the operating conditions of the PV and electrolyzer systems:

System Efficiency=PV system efficiency×Electrolyzer Efficiency

Figure 12:
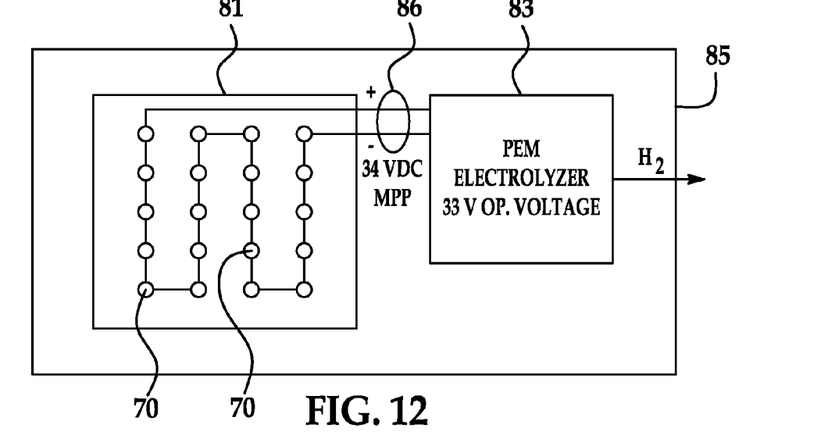
FIG. 12 is a schematic diagram depicting a 20 cell photovoltaic array connected to a PEM electrolyzer.

FIG. 12 shows another example of power matched to load. A 20-cell PV-array 81 powered PEM electrolyzer system 85 with a direct PV array to load connection 86 was optimized by matching the maximum power point (MPP) voltage (34 volts) of the 20-cell PV array 81 to the operating voltage (33 volts) of the PEM electrolyzer 83. The PV efficiency was 16%, and the PEM electrolyzer efficiency was 76%. By the using the system efficiency equation above, it can be shown that the PV-electrolyzer combination reached a maximum efficiency of 12%.

The second general type of distribution system shown schematically in FIG. 2 includes connecting the DC output 42 of the PV array 40 to an RESS 44. Matching the RESS 44 to the PV array 40 can be accomplished by the same methods used for other loads above. Batteries in the RESS 44 can store the PV array output that may later be used to power other loads and equipment used in processes. If Li-ion batteries are used in the RESS 44, the efficiency of PV solar battery charging is higher than solar-electrolysis (discussed above) because the efficiency of energy storage and recovery by charging and discharging Li-ion batteries is about 99% compared to an efficiency of 50-75% for converting electric energy to hydrogen fuel energy in an electrolyzer 83 (as shown in FIG. 12 and discussed above).

Tests were conducted using A123 Systems iron phosphate type model no. AS400059-001 Li-ion battery cells with the battery cells connected in series. When a Sanyo model HIP-190BA3 PV array with an MPP voltage of 50.2 volts DC at its usual PV operating temperature (52° C.) was directly connected to a Li-ion battery module with 15 battery cells in series (operational voltage of 49.5 volts DC), experimental tests showed that the system efficiency of renewable solar energy generation, storage, and recovery was optimized at nearly 15%. The "round trip" (solar energy to battery charge to electrical energy) system efficiency can be calculated by multiplying the PV solar energy to DC electric energy efficiency at the operating conditions (15%) times the charging efficiency (99%, battery charge divided by energy input) times the discharge efficiency (99%, battery output divided by battery charge) where each of the three individual efficiencies was experimentally determined by current and time duration measurements:

System Efficiency=PV system efficiency (15%)×Battery charging efficiency (99%)×Battery discharging efficiency (99%)=14.7%

The third general type of distribution system shown schematically in FIG. 2 includes using a sine-wave inverter 48 to convert DC power from a PV array 40 or RESS 44 to AC power that can be used to power AC loads 50. The transformed AC power may also be supplied to an electric power grid 52 through net metering 54.

As is schematically demonstrated in FIG. 2, a PV array 40 can efficiently supply power to, for example, an industrial site, meeting all of the site's power needs. When sunlight is available, DC power is made available for DC powered processes 22. The DC power is converted to AC power for AC loads at the site. Further, the DC output 42 of the PV array 40 may be used to charge an RESS 44. If there is surplus power available from the PV array 40, it may be "sold" to an electric power grid 52 through net metering 54 of the AC power. During times when the power demand at the industrial site exceeds the capacity of the PV array 40 and the RESS 44, power from the power grid 52 may be used to power AC loads 50. The AC power from the grid 52 may also be converted to DC power by an AC-DC rectifier 60 and used to power DC powered loads 22 if insufficient DC power is available from the PV array 40 or the RESS 44.

Figure 10:
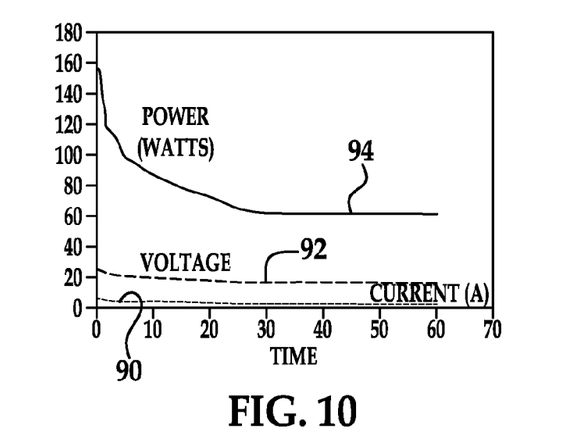
FIG. 10 is a graph depicting current, voltage and power curves for a photovoltaic array powered brushed DC motor driven system according to an example of the present disclosure.

A PV array 40 may be used to power processes that operate with a range of power loads. For example, a heating system 24 may have power settings ranging from low to high. A motor 28 may have, for example, low, medium and high speeds. As shown in FIG. 10, the current 90, voltage 92, and power 94 required by a brushed DC motor driven system may vary over time. FIG. 9 depicts power 94' and voltage 92' curves for a DC heating and lighting system at power-up. In the example, the power 94' and voltage 92' curves rise rapidly, but reach a substantially steady state within about 30 seconds. In a further example, a system may have several alternative processes that require different input operating voltages. To distribute PV array-generated DC current to power loads with energy efficiency and low net cost, the PV array 40 may be "tapped" such that a portion of the PV array 40 is connected to generate the highest voltage, at the maximum power point of the portion of the PV array 40, that is needed for any of the alternative processes at their highest power settings.

It is to be understood that "tapping" is connecting a portion of the PV array 40 to a load. A portion of the PV array 40 may be a subset of the PV cells and/or PV modules included in the PV array 40.

Figure 3:
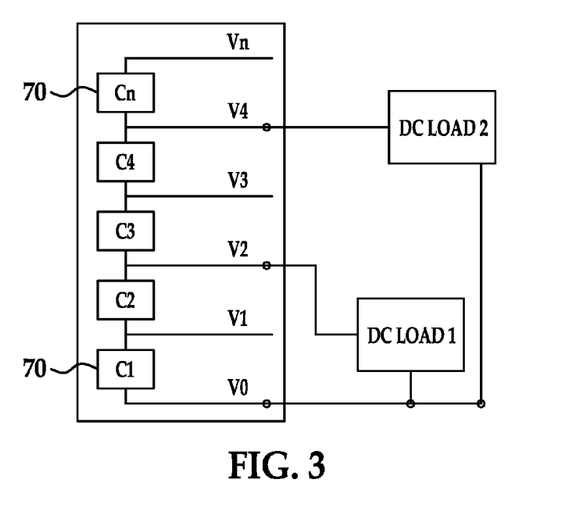
FIG. 3 is a schematic diagram depicting connection of loads to a photovoltaic array according to an example of the present disclosure.
Figure 4:
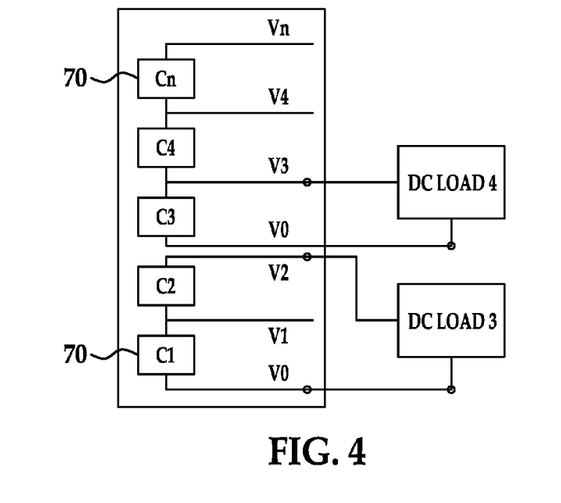
FIG. 4 is a schematic diagram depicting connection of loads to a photovoltaic array according to an example of the present disclosure.
Figure 5:
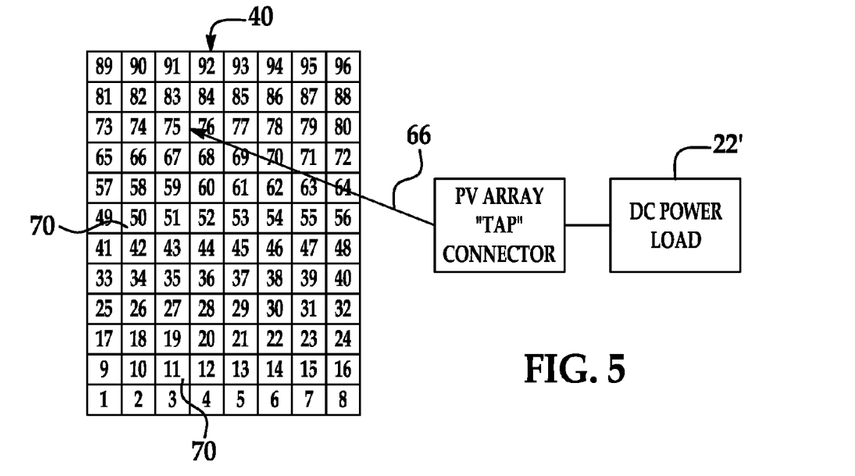
FIG. 5 is a schematic diagram depicting system connections in an example of the present disclosure.
Figure 6:
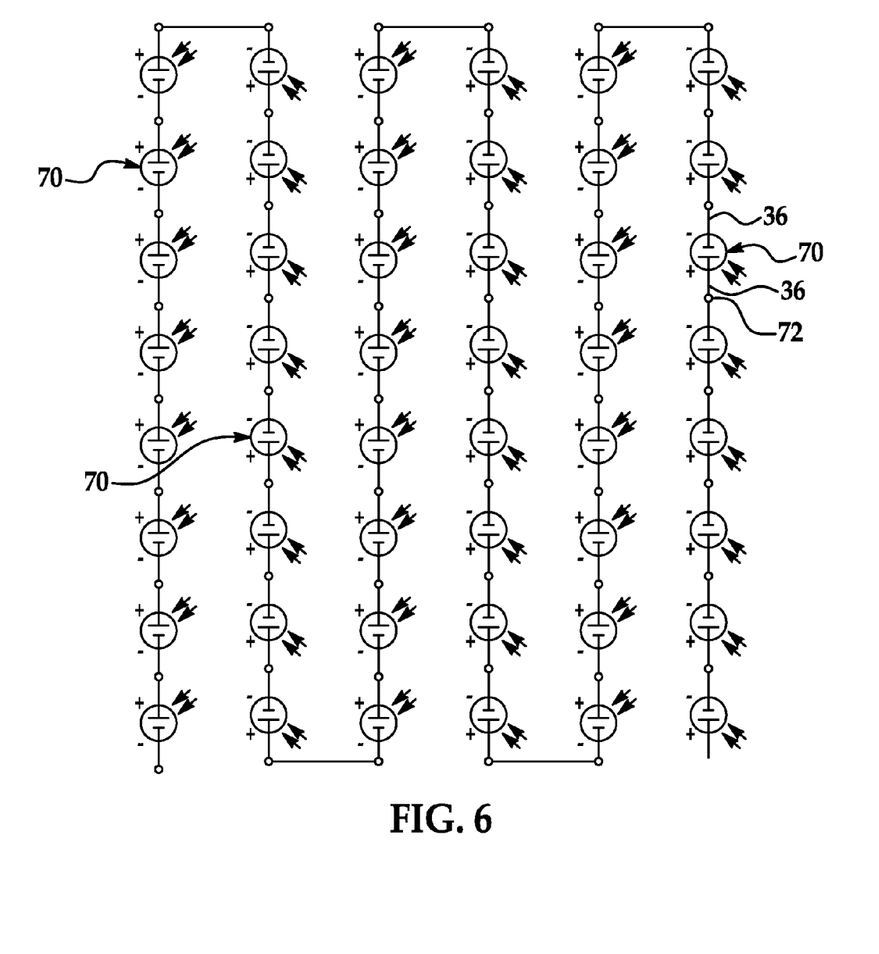
FIG. 6 is a schematic diagram depicting a photovoltaic array according to an example of the present disclosure.

As schematically shown in FIG. 6, PV cells 70 may be connected in series wherein the total voltage is a sum of all the PV cell 70 voltages. However, as schematically shown in FIG. 5, rather than using all of the available cells in a series, an electrical contact (tap 66) may be made between a selected pair of the connected cells 70 to draw power from only part of the series of connected cells 70. The series of cells 70 may be separated into more than one series of cells 70 as shown in FIG. 4, or a single series may share the load (as shown in FIG. 3). In the case of the shared load shown in FIG. 3, network calculations may be used to determine how the power will be apportioned between loads.

FIG. 5 schematically depicts a non-limitative example of a tapped PV array optimized for a DC powered load 22'. In the example, a series of 96 silicon cells in a Sanyo model HIP-190BA3 PV module (with a full MPP voltage of 50 volts at a typical operating temperature of 52° C.) may be tapped between cells 75 and 76. In the example, the voltage from the beginning connection at cell 1 to the tap 66 (cell 75) will be 39 volts. A calculation of the voltage is as follows: each cell has a voltage of 0.52 volts (50 divided by 96), and 75 cells have 39 volts (75×0.52 v). The voltage (39 volts) generated by the PV array 40 with this tap 66 connected as above can be used to power a DC powered load 22' that requires an operating voltage of 39 volts. To optimize the energy efficiency of any PV powered process, the tap 66 may be moved so that the maximum power point (MPP) voltage matches the operating voltage of the process. The remainder of the PV cells 70 in the PV array 40 may be connected to an other optimized DC load, converted using an inverter 48 to a power grid 52 and traded against grid purchased power (net metering) 54, or used to power processes using AC power 50 (as shown in FIG. 2). The 21 remaining solar cells shown in FIG. 5 (as found in a Sanyo HIP-190BA3 PV module) would produce 11 volts. However, any number of PV cells 70 may be connected in series to make the most useful DC voltages for processes and leave remaining cells 70 to power another DC process or be converted to AC power for AC loads. Any PV power not used within the local system may be sent to the power grid 52.

It is to be understood that efficient use of power generated by the PV array 40 may include minimizing total power lost from transmitting and converting power. For example, a large amount of electrical power is lost to heat as AC power is transmitted over long distances in, for example, a utility power grid. In order to reduce the losses, utility companies transmit the power at high voltage, and then step the voltage down in transformers close to the point of use. The conversion from high voltage to low voltage has losses associated with it. As disclosed herein, locally generated DC power does not suffer as much transmission loss as remotely generated AC power, and does not have the requirement for voltage conversion if the generated power is matched to the load as disclosed herein.

It is to be further understood that a portion of the electrical power from the PV array 40 may be unmatched to DC powered processes 22. The portion of the electrical power from the PV array 40 that is unmatched to DC powered processes 22 may be converted to AC power. The power from the DC to AC conversion may be connected to a local AC powered process 50, or a power grid 52. Local AC powered processes 50 may include, for example, computers, lighting, AC motors and the like. The DC to AC converted power may also be synchronized with, and introduced into a power grid 52' serving a large community. In another example, the DC to AC converted power may be synchronized with, and introduced into a local power grid 52". A non-limitative example of a local power grid 52" may be a power grid for a military Deployable Medical Systems (DEPMEDS) hospital.

Figure 13:
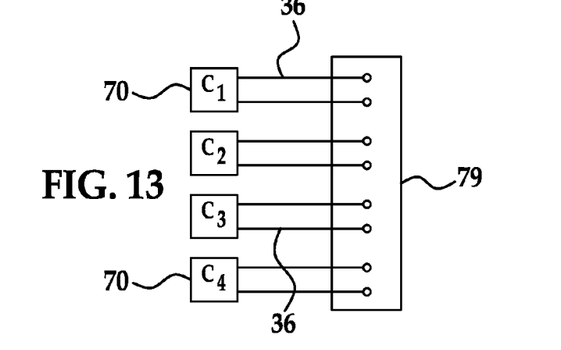
FIG. 13 is a schematic diagram depicting some of the photovoltaic cells of a photovoltaic array connected to a switch panel.

The PV array 40 may be reconfigured by selectively including PV cell 70 conductors 36 in a series network 76, a parallel network 77, or combinations thereof 78 to form a portion and the at least a second portion of the PV array 40. By way of example, conductors 36 leading from positive 38 and negative 39 sides of each PV cell 70 may be connected to adjacent PV cells 70 by connectors 72 (as shown in FIG. 6). As shown in FIG. 13, the conductors 36 may lead to a switch panel 79, where the conductors 36 may be conveniently connected manually, or by an automatic switching device (not shown). The connectors 72 may be, for example, removable jumpers. By selectively including or removing connectors 72, the PV array 40 may be configured to have a desired number of PV cells 70 in a desired network.

Figure 14:
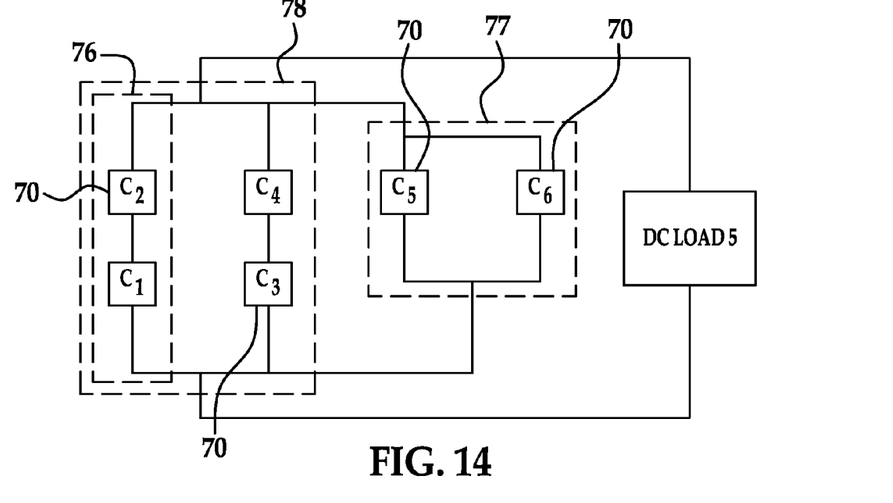
FIG. 14 is a schematic diagram depicting some of the photovoltaic cells of a photovoltaic array connected in series, in parallel, and in a combination of series and parallel.

Referring now to FIG. 14, the PV cells 70 may be connected in parallel 77, thereby increasing the current available; in series 76, thereby increasing the voltage available; or combinations of parallel and series connections can yield desirable combinations of current and voltage. It is to be understood that reconfiguring may be performed manually, or by an automatic switching means (not shown).

It is to be understood that a PV array 40 may include a plurality of PV cells 70 in a single PV module, (e.g. Sanyo model HIP-190BA3). A PV array 40 may further include a plurality of PV modules electrically connected to match current and voltage loads as disclosed herein. It is to be further understood that it may be desirable to configure a PV array 40 such that one or more of the PV cells 70 in the array 40 may be disconnected from a load and kept available as a reserve or replacement power source. If one or more PV cells 70 in an array 40 do not produce power within specified limits, then the array 40 may be configured to connect a reserve PV cell 70 in place of the out-of-specification PV cell 70, thus maintaining the ability of the PV array 40 to produce power matching the loads. In another example, reserve PV cells 70 may be connected to an aging motor (26, 28 in FIG. 2A) that requires more voltage and/or current to produce the same amount of torque than the motor 26, 28 did when new.

While several examples have been described in detail, it will be apparent to those skilled in the art that the disclosed examples may be modified. Therefore, the foregoing description is to be considered exemplary rather than limiting.

The invention claimed is:

1. A method for optimizing the use of solar electrical power, comprising:
   determining an operating voltage of a process and at least a second process;
   selectively connecting the process to a portion of a photovoltaic array having a maximum power point voltage matching the operating voltage of the process, the photovoltaic array having an available amount of electrical power; and
   selectively connecting the at least a second process to a respective at least a second portion of the photovoltaic array having a maximum power point voltage matching the operating voltage of the at least a second process;

wherein the available amount of electrical power from the array is distributed to the process and the at least a second process.

2. The method as defined in claim 1 wherein each of the selectively connecting steps further comprises electrically tapping the photovoltaic array between cells of the array.

3. The method as defined in claim 1, further comprising reconfiguring the photovoltaic array by selectively including photovoltaic cell conductors in a series network, a parallel network, or combinations thereof to form the portion and the at least the second portion of the photovoltaic array.

4. The method as defined in claim 1 wherein the process is a direct current (DC) powered process.

5. The method as defined in claim 4 wherein the process includes a heating system, a lighting system or combinations thereof.

6. The method as defined in claim 4 wherein the process includes a brushed DC motor.

7. The method as defined in claim 4 wherein the process includes brushless DC motors.

8. The method as defined in claim 1 wherein an ultimate one of the at least the second process includes a conversion from DC power to alternating current (AC) power.

9. The method as defined in claim 8 wherein the ultimate one of the at least the second process includes a connection to a power grid.

10. The method as defined in claim 8 wherein the ultimate one of the at least the second process includes a connection to a local AC powered process.

\* \* \* \* \*